United States Patent Office 2,931,028
Patented Mar. 29, 1960

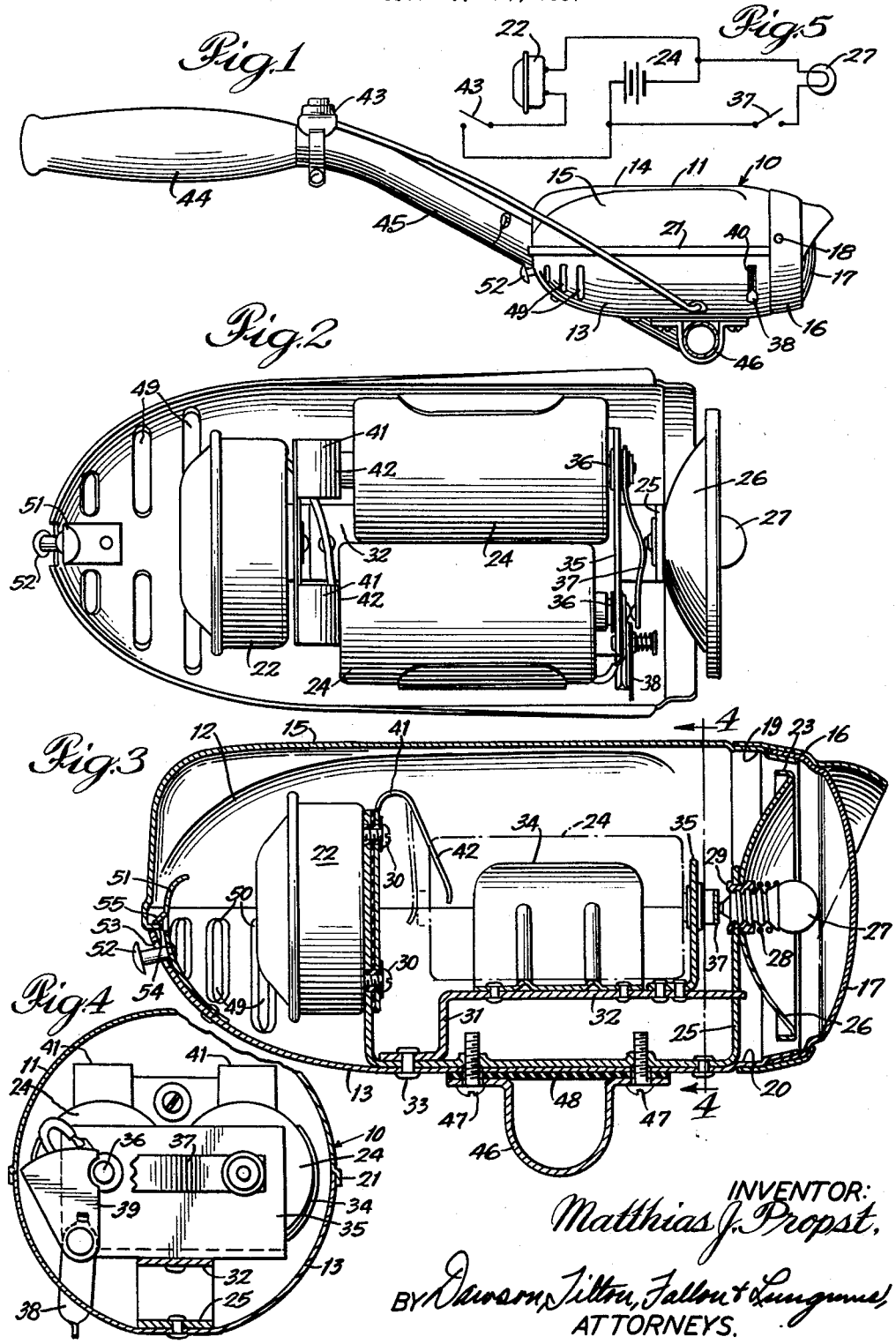

2,931,028

LIGHT AND HORN COMBINATION

Matthias J. Propst, Mundelein, Ill., assignor to Oxford International Corporation, Highland Park, Ill., a corporation of Illinois Application December 27, 1957, Serial No. 705,538

2 Claims. (Cl. 340—394)

This invention relates to a light and horn combination, and more specifically, to a self-contained warning and lighting unit particularly suited for use in conjunction with bicycles for mounting upon the handlebars thereof.

A principal object of the present invention is to provide a combination light and horn for bicycles having a case that may be easily and quickly opened for replacement of batteries, bulbs, etc., without detaching the unit from the bicycle upon which it is mounted. Another object is to provide a combined horn-light device having a two piece case which houses the light, horn and power means therefor, and which provides a substantially weatherproof enclosure for these elements. In that connection, it is a specific object to provide the case with openings for the transmission of sound without impairing the weatherproof characteristics thereof. A further object is to provide a compact horn and light unit for bicycles which is easily attached to a bicycle handle bar and which will be supported in balanced condition at its point of connection.

Other objects will appear from the specification and drawings in which:

Figure 1 is a side elevation taken partly in section showing a unit embodying the present invention in mounted condition upon a bicycle handle bar; Figure 2 is an enlarged top plan view showing the combined light and horn unit with the cover removed therefrom; Figure 3 is an enlarged vertical section of the unit with the cover or top section in place; Figure 4 is an enlarged broken cross sectional view taken along line 4—4 of Figure 3; and Figure 5 is a diagrammatic view of the circuit employed in an embodiment of the present invention.

Referring to the drawings, the numeral 10 generally designates a combined light and horn device provided with a casing 11 defining a chamber 12 therein. The case is horizontally elongated and is generally cylindrical in shape while being tapered or rounded at the rear end thereof. As shown most clearly in Figures 1 and 3, the casing essentially consists of two detachable parts; a base or lower section 13 and a cover 14.

The cover comprises an upper section 15 and a hooded rim or ring 16 equipped with a transparent lens 17 and permanently secured to the upper section by rivets 18 or by any other suitable fastening means such as welding. Since the rim and upper section are permanently fixed to each other, they serve as a single detachable cover unit 14 for the lower section 13. If desired, the rim and upper section may be formed integrally with each other.

In the illustration given, it will be seen that rim 16 overlaps and extends circumferentially about the reduced front portions 19 and 20 of the upper and lower sections. This overlapping relationship, combined with the fact that the peripheral edge portion of the plastic lens 17 is wedged between the rim and portions 19, 20, results in a substantially weather-tight seal between the rim and the casing sections. It will also be noted (Figures 1 and 4) that the upper and lower sections are separable along the horizontal mid-plane of the casing and that the upper section is provided with a peripheral lip 21 which overlaps the upper edge portion of the lower section. Since the upper section 15 is imperforate and extends beyond the periphery of the lower section, the contents of the casing are well protected against rain, snow, etc.

Supported within the casing upon the lower section thereof is a horn or buzzer 22, a light assembly 23 and an electrical power source 24. The electrical horn and light assembly are supported adjacent the rear and front ends respectively of the casing by a single U-shaped support member 25. The light assembly, including reflector 26, bulb 27, spring 28 and socket 29, is fixed upon the front upstanding arm of the support member while the horn 22 is fixed by screws 30 to the rear upstanding arm of that member. Between the arms of the U-shaped member 25 is a battery support member 31 which has a horizontal stretch or portion 32 spaced above the bottom of the lower casing section. The rear end of the battery support member 31 may be secured to both the U-shaped member and the lower section 13 by a rivet 33 while the front end of that member projects through an opening in the front upstanding arm of member 25 and is thereby rigidly interlocked therewith. A pair of flashlight batteries 24 are intermediately disposed in side-by-side relation within the horizontally elongated casing and are held in place by a spring clip 34 which extends transversely of the casing and which is fixed to the battery support member 31 by rivets or by any other suitable connecting means. Similarly, an upstanding plate 35 is secured to the support member 31 and is provided with insulated contact points 36 which make electrical contact with the front ends of the axially disposed batteries. A transverse electrically-conductive spring arm 37 is fixed to one of the contacts 36 and has its intermediate portion in continuous contact with bulb 27. A switch comprising an actuating arm 38 and a fan-shaped insulating member 39 are pivotally mounted upon the plate 35 and are movable between a normal position wherein the insulator 39 is interposed between the free end of spring conductor 37 and the adjacent contact point 36, and an actuating position wherein the insulator 39 is displaced laterally (Figure 4) so that it will not obstruct electrical contact between the opposing contacts. The switching arm 38 extends outwardly and downwardly through an opening 40 in the lower section of the casing and may be readily swung between raised and lowered positions for obstructing and completing the circuit for lighting bulb 27.

The batteries 24 are held in tight contact with points 36 by a spring member 41 secured in insulated condition to the rear upstanding arm of support bracket 25 and equipped with a pair of depending spring arms 42 which urge the batteries forwardly. It will be noted that the spring member 41 also makes electrical contact with the paired batteries which, as shown in Figure 2, are arranged in series relation.

Figure 5 is a diagrammatic representation of the circuit showing horn 22 and bulb 27 in parallel circuit arrangement. The electrical source 24 disposed between the horn and light supplies current to either or both the horn and light when switches 43 and 37 respectively are closed. In Figure 1, it will be seen that switch 43 takes the form of a push button switch mounted adjacent the grip 44 of bicycle handle bar 45. Preferably, the casing 11 is mounted near the central portion of the handle bar by connecting strap 46.

Strap 46 is securely connected to the central portion of the casing's lower section by screws 47 which pass through both the wall of the casing and the central portion of the U-shaped support member 25. If desired, a resilient gasket or cushion 48 may be interposed between the apertured legs of the strap and the outer lower surface of section 13. It is to be noted that the connecting strap is disposed directly below the paired batteries 24 which in turn are carried centrally within the casing or shell 11. Since the strap is located at the central balance point of the unit, it is believed apparent that the frictionally held batteries 24 are disposed in an area of least vibration within the casing. Furthermore, the central location of the batteries permits the unit to be mounted at its balance point upon the handle bar of a bicycle without projecting excessively either forwardly or rearwardly beyond the bar. As a result, the unit is capable of withstanding considerable shock and is not easily dislodged or twisted in its position upon the handle bar.

In Figures 2 and 3 it will be seen that the lower section 13 of the casing is provided adjacent the rear end thereof with a group of openings 49 for the emission of sound waves from the casing when horn 22 is energized. It will be noted that horn 22 faces rearwardly and that the group of openings is disposed behind that horn or buzzer. Since the openings 49 are provided only in the casing's lower section and since the upper section is imperforate, rain, snow etc., will not ordinarily pass into the interior of the casing through the openings. The inwardly turned peripheral flanges 50 about each of the openings 49 afford additional protection against the entrance of rain water or snow. However, even if moisture should collect within the lower section of the casing, the support members 25 and 31 support the light assembly, horn and power source well above the casing's lower inner wall and therefore maintain these elements in dry and operative condition.

The locking means for holding the cover in closed condition comprises a leaf spring 51 which engages the rear end of the cover and which may be flexed into releasing position by depression of push button 52. The spring has its lower end riveted or otherwise secured to the rear end of the lower section and projects upwardly above the upper rear edge of that section. The stem of button 52 is secured to the spring intermediate the ends thereof and projects rearwardly through an opening 53 at the rear of the casing's lower section. The lower edge of the cover adjacent spring 51 is provided with a forwardly extending projection 54 and this projection is normally engaged by a rearwardly and downwardly extending finger 55 provided by the portion of the spring above the lower section's upper edge. The tension of the spring urges the finger 55 rearwardly into locking engagement with the cover projection 54 (Figure 3). This tension may of course be overcome by urging button 52 forwardly, thereby flexing the spring forwardly into releasing position away from the cover projection 54. As shown most clearly in Figure 3, the upper free end of the leaf spring 51 is preferably curved forwardly so that the spring will be cammed forwardly by engagement with the cover's lower edge when the parts are being assembled.

Removal of the cover is accomplished simply by depressing button 52 and then lifting the unlatched rear end of the cover slightly above the free end of the locking spring 51. The unlatched cover is slid forwardly to move the lower portion of the lens rim free from the lower section, and the cover unit, including the lens rim, may then be lifted from the lower section of the casing. Since all of the operating elements, the lighting assembly, horn and batteries, are carried by the lower section of the casing, removal of the cover exposes all of these parts for inspection, repair or replacement. Thus, the batteries 24 and light bulb 27 may be readily removed for replacement when such replacement becomes necessary.

While in the foregoing I have disclosed an embodiment of the present invention in considerable detail for purposes of illustration, it will be understood by those skilled in the art that many of these details may be varied considerably without departing from the spirit and scope of the invention.

I claim:

1. A light and horn device comprising a horizontally elongated casing of generally circular cross section housing a horn, light and power source, said casing having a lower section and having an imperforate cover comprising an upper section and a lens-equipped rim affixed to the front thereof, said upper and lower sections being detachable along the casing's horizontal mid-plane for access to the contents thereof, said upper section being provided with a lip extending over and releasably engaging the upper edge portion of said lower section along the horizontal mid-plane of said casing, a U-shaped supporting member secured within said casing to the lower section thereof and having spaced upstanding front and rear arms, said light being secured to said front arm and said horn being secured to said rear arm within said casing, said power source being centrally disposed within said casing between said front and rear arms and comprising a pair of batteries electrically connected to said horn and light and arranged in side-by-side relation, a connecting member secured to the under surface of said lower section directly beneath said batteries and at the center of balance of said device for connecting said device to the handle bar of a bicycle, a plurality of openings provided in said lower section behind said horn for the emission of sound produced thereby while being sheltered by said imperforate cover against the exposure of the contents of said casing to rain and snow, and locking means for releasably securing said cover upon said lower section.

2. A light and horn device comprising a horizontally elongated casing housing a horn, light and power source, said casing having a lower section and having an imperforate cover comprising an upper section and a lens-equipped rim affixed to the front end thereof, said upper and lower sections being detachable along the casing's horizontal mid-plane for access to the contents thereof, said upper section being provided with a flange extending over the upper edge portion of said lower section along the casing's horizontal mid-plane, a supporting member disposed within said casing and secured to the lower section thereof, said light being secured to said supporting member and being disposed adjacent the front end of said casing, said horn being secured to said supporting member adjacent the rear end of said casing, said power source being centrally disposed within said casing and between said light and horn, said power source comprising a pair of batteries arranged in side-by-side relation and being electrically connected at opposite ends thereof to both said horn and light, a plurality of openings provided in said lower section behind said horn for the emission of sound produced thereby, and a connecting member secured to the under surface of said lower section directly beneath said batteries and at substantially the center of balance of said device for attaching said device to a bicycle.

References Cited in the file of this patent

UNITED STATES PATENTS

| | | |
|---|---|---|
| 1,435,002 | Goodwin et al. | Nov. 7, 1922 |
| 2,124,222 | Wiley | July 19, 1938 |
| 2,191,932 | Crimmins | Feb. 27, 1940 |
| 2,193,544 | Wiley | Mar. 12, 1940 |
| 2,273,130 | Meyerhoefer | Feb. 17, 1942 |